United States Patent Office 3,364,196
Patented Jan. 16, 1968

3,364,196
DIHYDROCHALCONE DERIVATIVES AND
METHOD FOR THEIR PRODUCTION
Jacob R. Feldman, New City, Matthew Hamell, Orangeburg, and William W. Ward, White Plains, N.Y., assignors to General Foods Corporation, White Plains, N.Y., a corporation of Delaware
No Drawing. Filed Aug. 26, 1964, Ser. No. 392,296
4 Claims. (Cl. 260—210)

ABSTRACT OF THE DISCLOSURE

Dihydrochalcone compounds are prepared by dissolving flavanone glycosides in an alkaline solution to hydrolyze the flavanone glycosides to chalcone compounds and treating the reaction mixture with a stream of hydrogen gas in the presence of a hydrogenating catalyst.

---

The present application relates to a method for producing dihydrochalcone compounds and their derivatives and more particularly to a method for producing dihydrochalcones from compounds such as naringin, neohesperidin, prunin, eriodictyol-7-neohesperidoside and homoeriodictyol-7-neohesperidoside.

Dihydrochalcone derivatives have been disclosed to be useful for imparting sweetness to materials, especially food products. As they have an intense sweetness, these compounds have become of interest to chemists and food technologists in the food stuffs industry. Known methods for producing these compounds, however, provide low yields and have the further disadvantage of requiring long processing times with many unit operations.

The prior art method for the production of dihydrochalcone derivatives is a multistep time-consuming procedure which consists in dissolving the starting material in an aqueous alkaline solution at room temperature, permitting the solution to stand for several hours, then cooling the solution to 0° C., acidifying the solution with cold concentrated hydrochloric acid and again allowing the solution to stand at 0° C. for several hours to precipitate the chalcone derivatives. The precipitate is filtered off, washed with cold water, pressed dry, and then dried thoroughly at room temperature in a desiccator under vacuum. The product is then purified by recrystallizing from boiling water.

The chalcone derivative obtained in the foregoing manner is then dissolved in ethanol and hydrogenated at room temperature and atmospheric pressure, using palladium-carbon (10%) as catalyst. The resulting solution is evaporated to dryness at 60° C. under vacuum and the residue crystallized twice from an aqueous solution to yield the dihydrochalcone derivative. The over-all yield if dihydrochalcone derivative according to the foregoing method, based on amount of starting material, is only from 25–27% and the material so prepaerd has an off-flavor.

It is, therefore, an object of the present invention to provide a new and improved method for producing these compounds in high yields. Another object is to provide a shorter, more simplified process for their production. A further object is to provide a method for preparing these compounds and their derivatives in more highly purified form.

It has now been found that a more highly purified product may be obtained in higher yields by hydrogenating an alkaline solution of the starting material. Suitable starting materials are flavanone glycosides, for example, naringin, neohesperidin, prunin, eriodictyol-7-neohesperidoside and homoeriodictyol-7-neohesperidoside. These compounds may be dissolved in any suitable solvent, for example, water, ethanol, methanol, and aqueous ammoniacal solutions. The alkalinity may be imparted by alkalies, e.g., alkali metal and alkaline earth metal hydroxides, e.g., sodium and potassium hydroxides, ammonium hydroxide or calcium hydroxide. The hydrogenation may take place at low or high pressures, at room temperature or below, or at elevated temperatures. Conventional hydrogenation catalysts may be employed, e.g., palladium-carbon, palladium, platinum, nickel, and the like.

The following examples illustrate the present invention without, however, limiting the same thereto.

Example I 20.0 g. of naringin were dissolved in a mixture of 200 ml. of 95% ethanol, 50 ml. of water and 10 ml. of 25% KOH. The solution was hydrogenated in a Parr Low Pressure Hydrogenator at room temperature using as catalyst 5 g. of 5% Pd on charcoal. A pressure drop of 45 lbs. was obtained in a short time and the hydrogenation leveled off. The solution was filtered with Celite and the filtrate acidified with HCl to a pH of 4.0 (about 4.5 ml. of concentrated HCl were required). The solution was evaporated to dryness under reduced pressure (11–15 mm. Hg) at a bath temperature of 60° C. The resulting solid was taken up in 100 ml. of hot water, chilled and filtered. It had a melting point between 160–162° C. and on recrystallization from water yielded a white product having a melting point of 165–168° C. The yield was 14.4 g. or 72% of the theoretical amount.

Example II 20.0 g. of naringin were dissolved in 150 ml. of water containing 11.5 ml. of 25% KOH. The resulting mixture was hydrogenated using as catalyst 5 g. of 5% Pd on charcoal. After the hydrogenation was completed, the solution was filtered, acidified and the resulting white solid filtered off. The solid material which was recrystallized from water had a melting point 165–168° C. The yield was 14.1 g. or 70.5% of the theoretical quantity.

Example III

Starting with 50 g. of naringin, and using the prior art method mentioned hereinabove, the yield of naringin dihydrochalcone was 13.5 g. This corresponds to only 27.0% of the theoretical amount.

Example IV

Another run was made employing the prior art method of the previous example starting with 50 g. of naringin. A yield of 12.5 g. or only 25.0% of the theoretical quantity of naringin dihydrochalcone was obtained.

While the present invention has been described with reference to specific examples, various modifications thereof will be apparent to those skilled in the art and the invention is to be limited only by the following claims.

What we claim is:

1. In a process for producing dihydrochalcones by hydrolyzing flavanone glycosides to chalcones in an alkaline solution and hydrogenating said chalcones to dihydrochalcones, the improvement comprising treating the alkaline solution of chalcones with a hydrogenating agent to form dihydrochalcones in the alkaline reaction solution.

2. The process of claim 1 wherein said hydrogenating agent is hydrogen gas.

3. The process of claim 2 wherein the dihydrochalcone is separated from the reaction mixture.

4. The process of claim 3 wherein the separation is effected by filtering the reaction mixture and acidifying the filtrate to precipitate the dihydrochalcone.

References Cited

UNITED STATES PATENTS 2,700,047   1/1955   Wilson _____ 260—210
3,087,821   4/1963   Horowitz et al. _____ 260—210

LEWIS GOTTS, *Primary Examiner.*

J. R. BROWN, *Assistant Examiner.*